United States Patent [19]

Hara et al.

[11] Patent Number: 5,163,893
[45] Date of Patent: Nov. 17, 1992

[54] AIRBAG FOLDING APPARATUS

[75] Inventors: Noboru Hara; Hiroshi Miyajima; Hisayasu Sugita; Hirohisa Yokoyama, all of Aichi, Japan

[73] Assignees: Toyoda Gosei Co., Ltd., Nishikasugai, Japan; Kolbenschmidt Aktiengesellschaft, Neckarsulm, Fed. Rep. of Germany

[21] Appl. No.: 656,717

[22] Filed: Feb. 20, 1991

[30] Foreign Application Priority Data

Feb. 20, 1990 [JP] Japan ................... 2-39400
Apr. 24, 1990 [JP] Japan ................. 2-108341
Apr. 24, 1990 [JP] Japan ................. 2-108342

[51] Int. Cl.$^5$ ................... B31B 1/26; B60R 21/16
[52] U.S. Cl. ..................... 493/458; 493/451; 493/940; 280/743
[58] Field of Search ........... 493/451, 458, 405, 457, 493/939-940; 280/728, 729, 730, 731, 732, 743

[56] References Cited

U.S. PATENT DOCUMENTS

| | | |
|---|---|---|
| 3,918,699 | 11/1975 | Arbter ................. 493/405 |
| 4,004,828 | 1/1977 | Sogabe . |
| 4,173,356 | 11/1979 | Ross . |
| 4,235,453 | 11/1980 | Lawson . |
| 4,265,439 | 5/1981 | Sundberg ............. 493/451 |
| 4,286,954 | 9/1981 | McArthur . |
| 4,351,544 | 9/1982 | Ross . |
| 4,867,736 | 9/1989 | Rasmussen et al. ........... 493/940 X |
| 4,892,514 | 1/1990 | Johnson ............... 493/451 |
| 4,936,819 | 6/1990 | Sundberg ............. 493/451 |

FOREIGN PATENT DOCUMENTS

| | | |
|---|---|---|
| 2525440 | 12/1976 | Fed. Rep. of Germany . |
| 3544704 | 6/1987 | Fed. Rep. of Germany . |
| 0099442 | 4/1990 | Japan ................ 280/743 |
| 2279441 | 11/1990 | Japan ................ 280/743 |
| 3170194 | 7/1991 | Japan ................ 280/728 |

Primary Examiner—Bruce M. Kisliuk
Assistant Examiner—John A. Marlott
Attorney, Agent, or Firm—Cushman, Darby & Cushman

[57] ABSTRACT

An apparatus and method is described for automatically folding airbags a plurality of times in stages of predetermined width. Both longitudinal and lateral folds may be accomplished. A plurality of inward and outward folding bars are automatically positioned relative to the airbag and transferred to interleaving positions to fold the airbag.

15 Claims, 13 Drawing Sheets

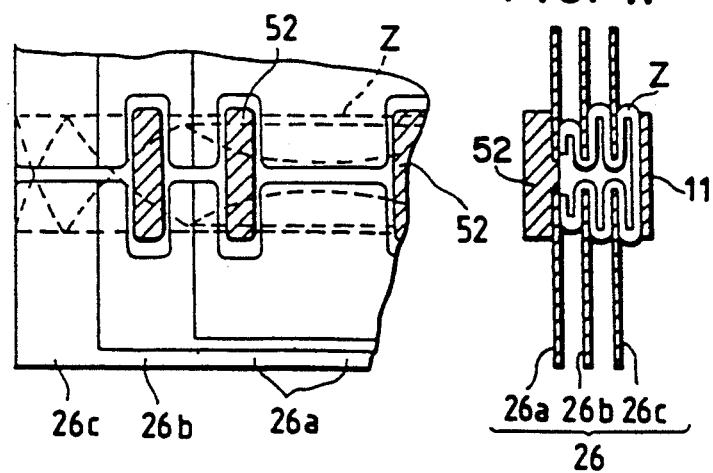
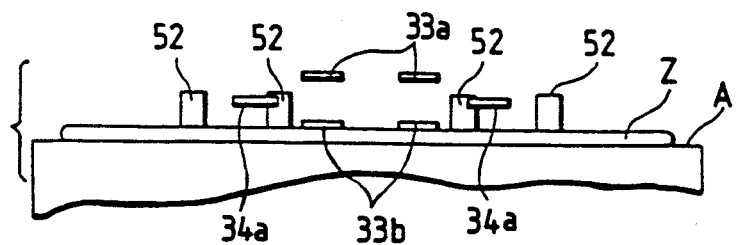
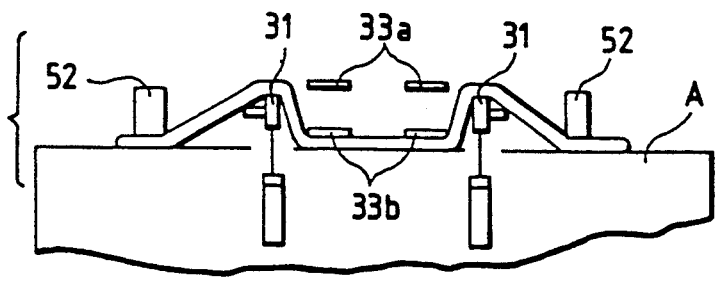
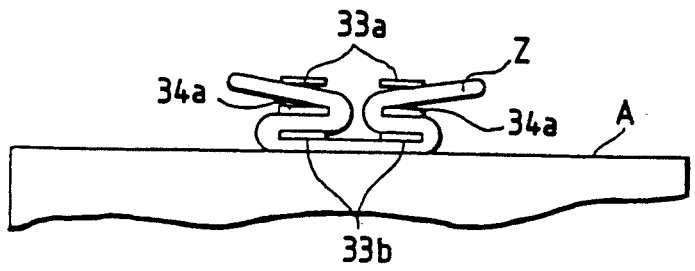

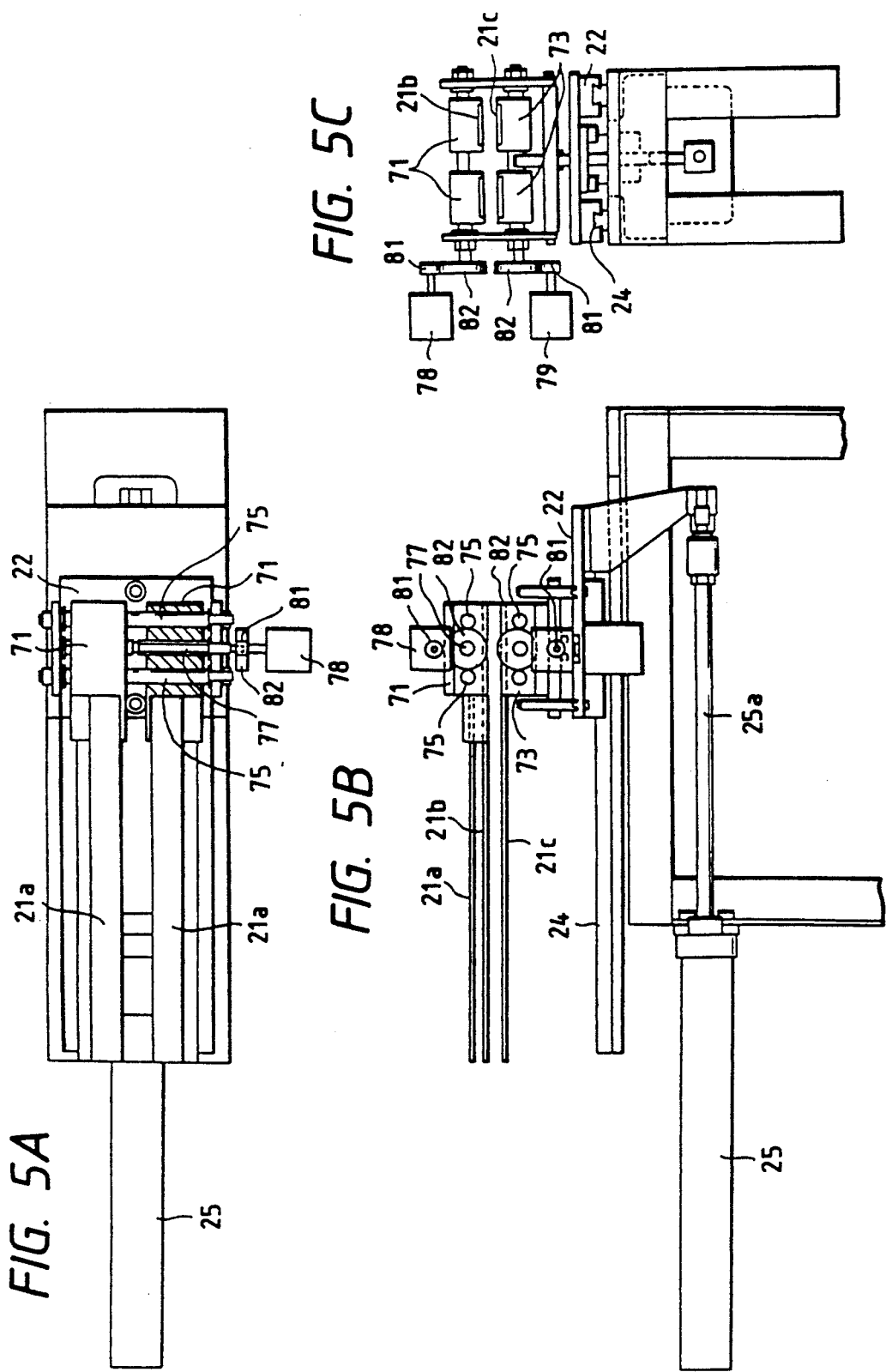

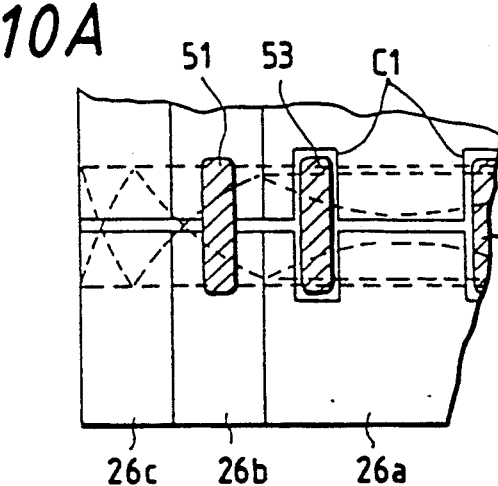
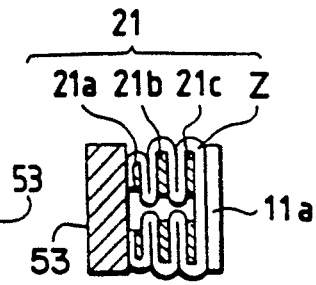
FIG. 10A
FIG. 10B
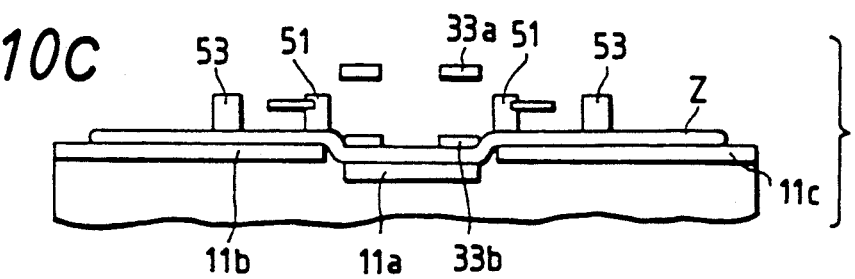
FIG. 10C
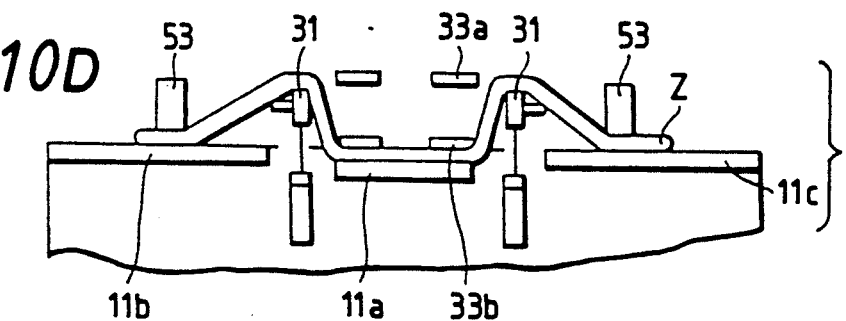
FIG. 10D
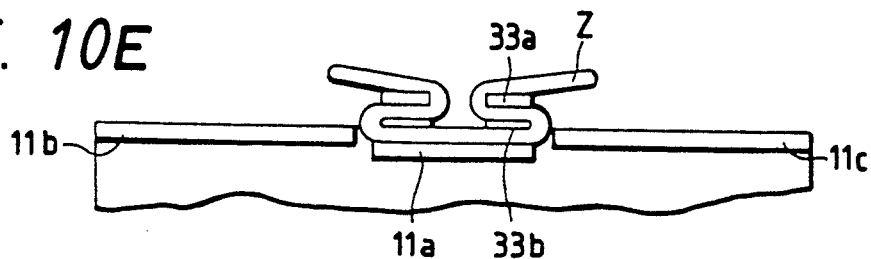
FIG. 10E

AIRBAG FOLDING APPARATUS

BACKGROUND OF THE INVENTION

1. Field of the Invention

The present invention relates generally to a method and apparatus for folding an airbag prior to disposing the airbag in an airbag apparatus to be installed in a steering wheel or the like of a vehicle. More particularly, the airbag is folded a plurality of times to predetermined widths in the lateral and longitudinal directions.

2. Description of the Related Art

A conventional method of folding airbags will be explained with reference to FIGS. 12 to 14. In one known folding method, a plurality of lateral folding bars 1 and longitudinal folding bars 2 are provided. Each folding bar has guide holes in its opposing ends. To accomplish folding, the appropriate number of lateral folding bar holding pin pairs 5,5 and longitudinal folding bar holding pin pairs 6,6 are set in the longitudinal and lateral directions on the working table 4. The pins support the folding bars 1 and 2 respectively during the lateral and longitudinal foldings. Usually, folding the airbag is carried out by two persons, including a main worker M1 who folds the airbag Z and a helper M2 who sets the folding bars and removes the folding bars after folding is completed.

To prepare for folding, the airbag Z is extended on the working table 4 and the air in the airbag 4 is exhausted through an inflater fitting hole (not illustrated) provided in the lower part of airbag Z. The helper M2 then sets the first folding bar 1a on the airbag Z and worker M1 makes the first outward fold F1 in a first side of airbag Z while pulling the airbag as shown in FIG. 12. Thereafter, the second folding bar 1b is set over the airbag and the first folding bar 1a. The airbag is then folded inward to create the first inward fold v1 in the first side of the airbag Z. In succession, the third folding bar is set over the second folding bar to make the second outward fold F2. After all of the lateral folds for one side of the airbag have been completed by repetition of such foldings, the opposing side of the airbag Z is folded by sequentially setting the folding bars in the same manner as previously described. Once the lateral folds have been completed, the worker M1 holds the airbag Z as the helper M2 removes the lateral folding bars 1, thereby completing the lateral folding. (FIG. 13).

The longitudinal folding is then done is the same way by changing the folding direction 90 degrees. More particularly, the longitudinal folding bar 2 is then set across the airbag Z (which has previously been laterally folded). The first longitudinal outward and inward folds L1, I1 and the second longitudinal outward fold L2 are carried out for the respective sides. Thereafter, the folding bars are removed, thus completing the longitudinal folding. (FIG. 14).

In the prior art method explained above, the size of the folding bar for the various folds are slightly different. Therefore, erroneous folds are sometimes been made because the helper's improperly sets the folding bars. Moreover, two persons are required for folding and thus, the man-hours required for folding are relatively high.

SUMMARY OF THE INVENTION

Accordingly, it is a primary objective of the present invention to provide a method and apparatus for folding an airbag which reduces the number of manual folding steps and substantially eliminates erroneous folds.

To achieve the foregoing and other objects a folding apparatus is provided for folding airbags a plurality of times in stages of predetermined width. The apparatus includes a working surface having a setting portion for holding the airbag. An outward folding mechanism is provided that includes a plurality of spaced apart outward folding bars. The outward folding bars are movable between positions clear of the setting portion and positions over the setting portion.

An inward folding mechanism is also provided. It includes a plurality of spaced apart inward folding bars, the inward folding bars are selectively moveable between positions clear of the outward folding bars and positions wherein they are interleaved with the outward folding bars to fold the airbag.

In one preferred embodiment, both lateral and longitudinal folding mechanisms are provided. The lateral folding mechanism has a plurality of parallel spaced apart outward lateral folding bars and at least one inward lateral folding bar arranged to selectively interleave with the outward lateral folding bars to laterally fold the airbag. Similarly, the longitudinal folding mechanism has a plurality of parallel spaced apart longitudinal outward folding bars arranged in a direction substantially orthogonal to the lateral outward folding bars. An inward longitudinal folding bar is arranged to selectively interleave with the outward longitudinal folding bars to longitudinally fold the airbag.

The various lateral folding bars are preferably arranged in two opposed sets. Each set includes a plurality of outward folding bars and a plurality of inward folding bars. The sets are positioned on opposite sides of the airbag.

In accordance with the method of the invention, an airbag is initially placed on a working surface of the folding apparatus. The airbag is first laterally folded in a plurality of stages. Preferably folding is accomplished on two opposing sides. When desired, the airbag may also be longitudinally folded after the lateral folding has been completed.

BRIEF DESCRIPTION OF THE DRAWINGS

The novel features of the present invention are set forth with particularity in the appended claims. However, the invention its objects and advantages, may best be understood by reference to the following description of the presently preferred embodiments together with the accompanying drawings in which:

FIGS. 4A–4I schematically show the airbag folding process using an apparatus in accordance with the first embodiment;

FIG. 5A is a plan view of a width adjusting mechanism for the outward folding mechanism in the lateral folding means;

FIG. 5B is a front elevation of the width adjusting mechanism shown in FIG. 5A;

FIG. 5C is a side elevation of the width adjusting mechanism shown in FIG. 5A;

FIGS. 10A-10D show steps in the longitudinal folding process in accordance with the second described method of folding airbags;

Detailed Description of the Preferred Embodiments

Figure 13A:
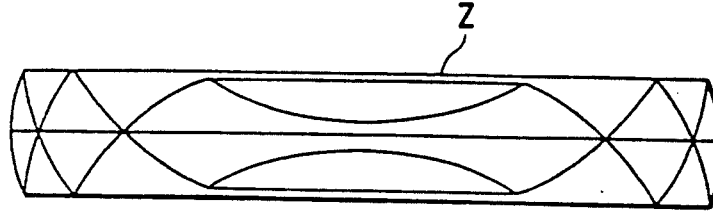
FIG. 13A is a schematic top plan view of a laterally folded airbag.
Figure 13B:
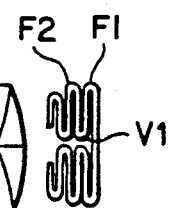
FIG. 13B is a schematic side elevation of a laterally folded airbag.
Figure 14A:
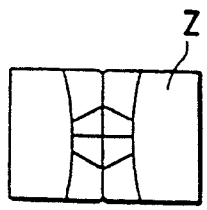
FIG. 14A is a schematic top plan view of a longitudinally folded airbag.
Figure 14B:
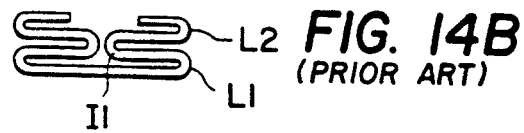
FIG. 14B is a schematic front elevation of a longitudinally folded airbag.
Figure 12:
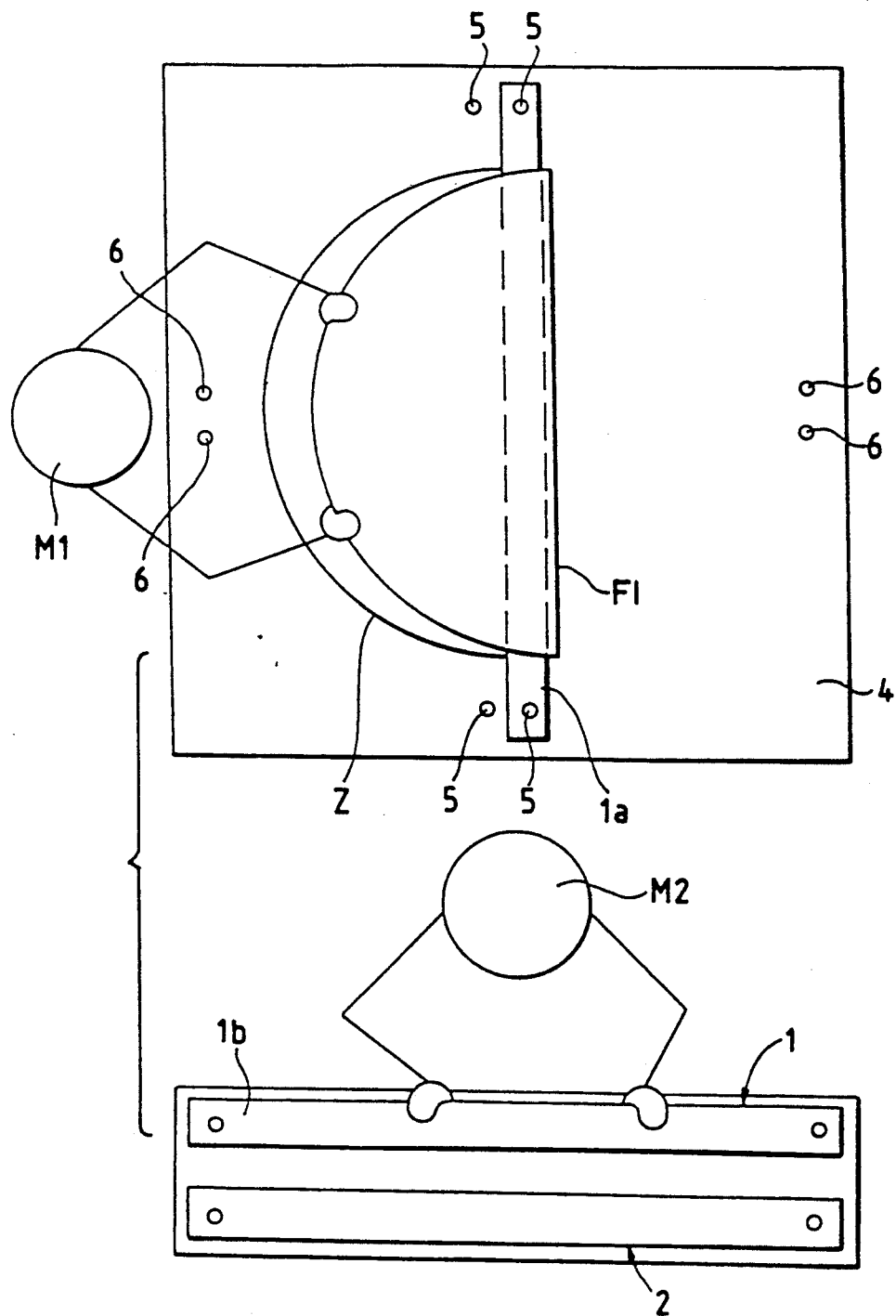
FIG. 12 is a schematic top plan illustration for explaining a prior art airbag folding apparatus and technique.

The present invention will be explained in detail with reference to the embodiments thereof shown in the drawings. An apparatus for mechanically folding an airbag Z a plurality of times in multiple stages is provided. The airbag is folded to a predetermined width by utilizing a plurality of folding bars. The resultant lateral folding shown in FIG. 13 is considered the basic folding pattern since in some embodiments, it may not be necessary to include longitudinal folding. The described longitudinal folding pattern is shown in FIG. 14. By way of background, the embodiments of the invention described contemplate folding an airbag having a centrally located inflater opening.

Figure 1:
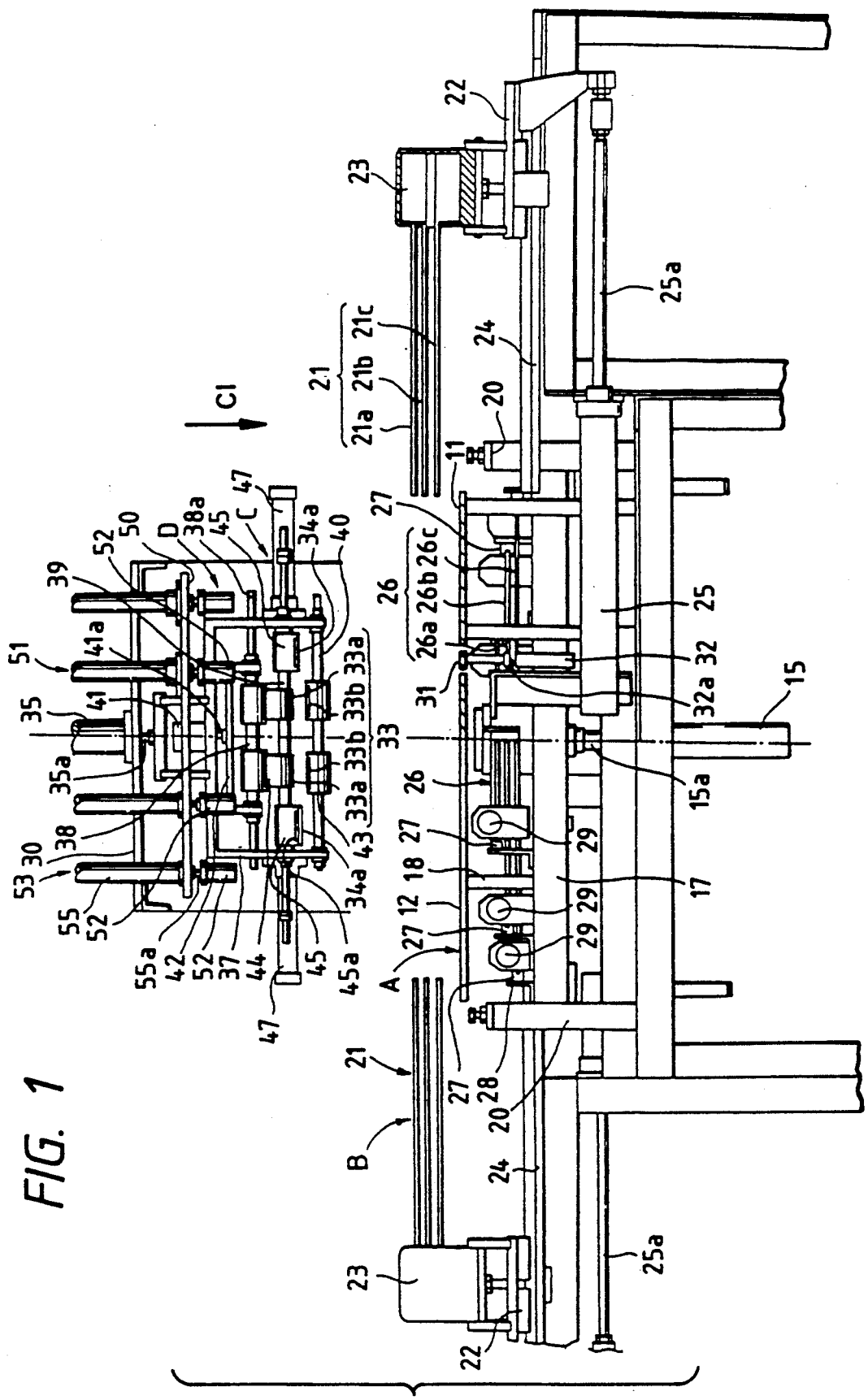
FIG. 1 is a schematic, front elevational view, partly in cross section, showing an apparatus for folding an airbag in accordance with the first embodiment of the invention.
Figure 2:
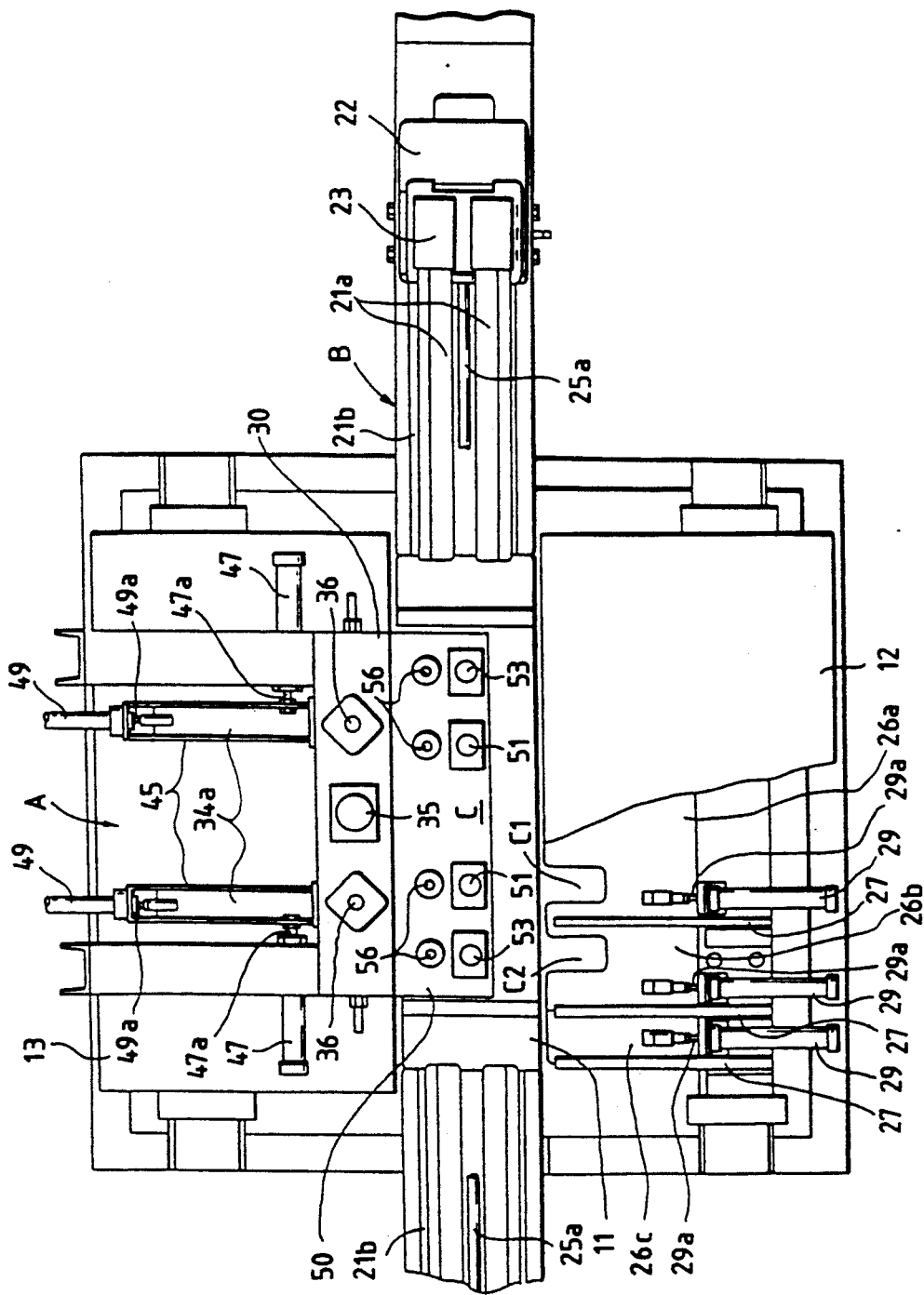
FIG. 2 is a schematic top plan view of the folding apparatus shown in FIG. 1, with parts broken away for clarity.
Figure 3:
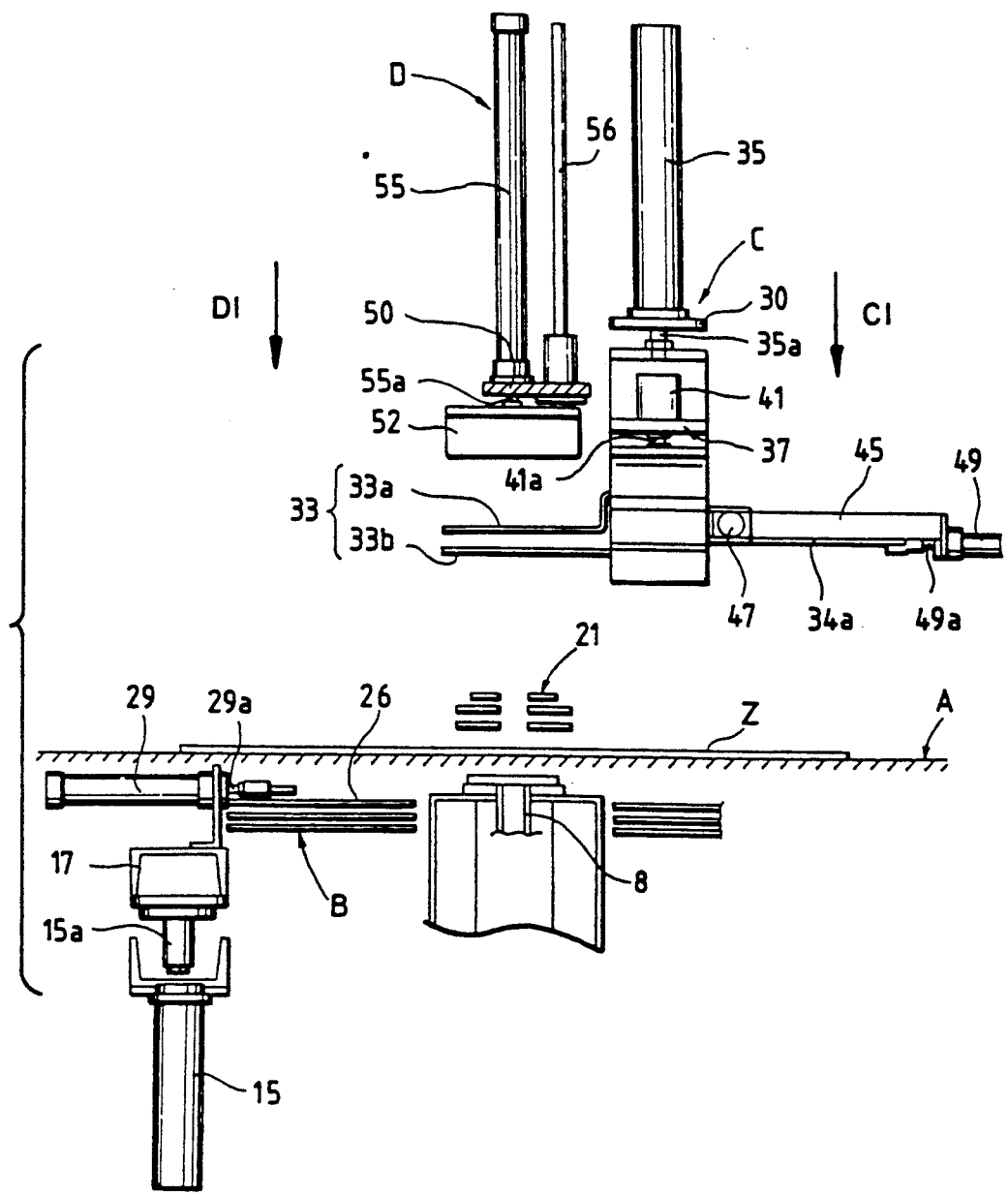
FIG. 3 is a schematic side elevation of the folding apparatus shown in FIG. 1.

Embodiment 1:

FIGS. 1-3 show a first apparatus for folding an airbag. The apparatus includes a working table A, a lateral folding means B, a longitudinal folding means C and a bag holding means D.

The construction of the working table A will initially be described. A central plate 11, (FIG. 1) a front plate 12 (FIG. 2) and a back plate 13 (FIG. 2) are symmetrically arranged to form a horizontal working plane. The central plate 11 functions as a setting portion that supports the central area (i.e. inflater opening region) of the airbag Z. It is almost the same width as the desired lateral folding width of the airbag Z. The front plate 12 and back plate 13 are positioned on opposite sides of the central plate 11 and function as supporting plates which are capable of supporting an extended airbag Z in a horizontal working plane that is co-planer with the central plate 11. The front plate 12 and back plate 13 may be selectively lifted to a raised position relative to the central plate 11. When they are so lifted, the outer portions of airbag Z are similarly lifted such that they are positioned higher than the airbag's central area.

More specifically, the front plate 12 and back plate 13 are connected through a coupling pole 18 to an inward folding bar holder 17 of the lateral folding means B (described below). The inward folding bar holder 17, in turn, is connected to piston rods 15a of a plurality of first vertical cylinders 15. In the alternative, it should be understood that such relative movement could be realized by vertical movement of the central plate 11.

Figure 4A:
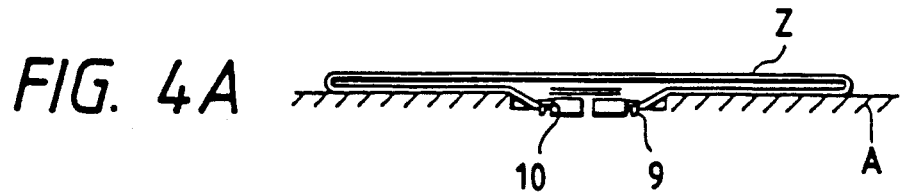

The central area of central plate 11 has a metal setting hole 9 for receiving an airbag support plate 10 (FIG. 4A). A suction pipe 8 (see FIG. 3) coupled to a vacuum source (not shown) extends upward through the hole 9 and is provided to remove air from the airbag prior to folding. It should be noted, however, that such exhaustion of air from the airbag Z is not essential to the operation of the folding apparatus and thus, the suction pipe 8 may be omitted.

Although the central plate 11 has been described as being substantially the same width as the desired lateral fold width, such is not necessary. Rather, the folding width is determined by the size and positioning of the outward folding bars 21a-21c. Thus, the actual central plate width may be greatly varied.

Figure 4B:
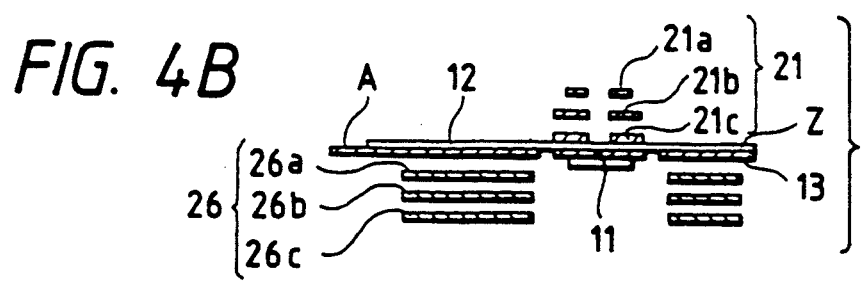
Figure 4C:
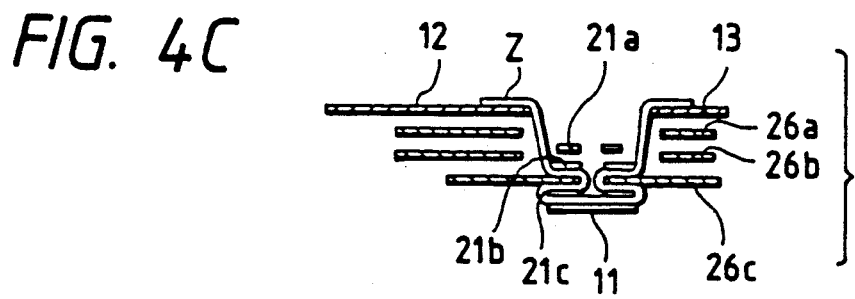
Figure 4D:
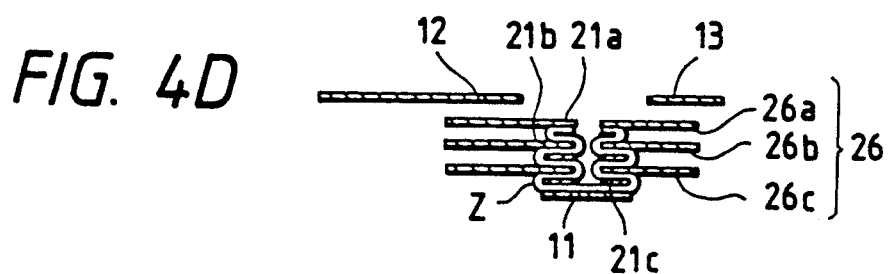

The construction of the lateral folding means B will be described next. The lateral folding means is composed of outward folding mechanism 21 and inward folding mechanism 26. The outward folding mechanism 21 has a plurality of stages which are movable forwardly and backwardly relative to at least one side of the upper part of the central plate 11. The inward folding mechanism 26 has a plurality of stages which are arranged below the front plate 12 and back plate 13 and are movable forwardly and backwardly so that when the inward folding mechanism is located above the central plate 11, the stages can be respectively inserted into the gaps between the stages of the outward folding bar 21 while carrying airbag Z (FIGS. 4C and 4d). In this manner, the lateral folding may be accomplished.

The outward folding mechanism 21 is divided into two spaced apart, opposing sections. The opposing sections are disposed above opposite longitudinal ends of the central plate 11. Each lateral folding mechanism section is held by a holding block 23 carried by a truck 22 and is divided into three stages. Since the sections are identical in construction, only one will be described for clarity. The truck 22 runs on a rail 24 and is coupled with a piston rod 25a of a first horizontal cylinder 25. The outward folding bar 21a of the upper stage is narrower than the outward folding bars 21b and 21c of the intermediate and lower stages. Moreover, although it is not necessary, the outward folding bar pairs 21a,b&c are preferably independently closable.

A structure suitable for opening and closing the gap between various folding bar pairs relative to one another is shown in FIG. 5. The outward folding bars 21a, 21b of the upper and intermediate stages are both held by a first drive block 71. Each section has a corresponding drive block, thus a pair of adjacent drive blocks 71 are provided. The outward folding bars 21c of the lower stages are similarly held by a second drive block pair 73, 73.

The sides of drive block 71, 73 are held by guide rods 75, 75 and the central areas thereof are engaged by a drive screw 77. A forward section of drive screw 77 (which passes through front block 71) is formed as a right screw, while the back section of the drive screw (passing through back block 71) is formed as a left screw so that rotation of the drive screw 77 in one direction results in the opens the gap between associated folding bar pairs 21a, 21b. Conversely, rotation of the drive screw 77 in the opposing direction closes the gap between the folding bar pairs. The drive screw 77 is driven by gears (drive gear 81 and driven gear 82) which in turn are driven by a motor 78. The lower blocks 73, which carry lower outward folding bars 21c, are independently driven by a similar structure. In the case of the lower blocks 73, their corresponding drive screw is driven by motor 79 through another set of appropriate gears 81, 82. The supporting table is not illustrated in FIG. 5 for simplification of that figure.

With the structure described above, the lateral folding width can be readily changed merely by changing the spacing of the outward folding bars. Since the lower outward folding bar 21c is driven separately from the upper and intermediate folding bar pairs, a great deal of flexibility is provided for adjusting the folding width of the various stages. Additionally as will be indicated below, removal of the folding bar can be easily accomplished with this structure.

As seen in FIG. 1, a stopper 20 is provided to regulate the lifting position of the lateral inward folding mechanism 26. Each inward folding mechanism 26 is held by a pair of holding rails 27 which take the form of slide grooves (FIGS. 1 and 2). The holding rails 27 are pivotally supported by an angle member 28 (FIG. 1). In addition, each inward folding mechanism 26 is coupled with the piston rod 29a of a second horizontal cylinder 29 provided on the inward folding bar holding table 17.

When the inward folding mechanism 26 is raised such that it is positioned above the central plate 11, the front and back plates 12, 13 (which rise therewith) lift the outer portions of the airbag Z. Thus, when the inward folding bars are is inserted into the gaps between the various stages of outward folding bar 21, folding of the airbag Z is accomplished.

The longitudinal folding means C will be described next. The longitudinal folding means C includes a pair of lifting members 31, an outward folding mechanism 33 and an inward folding mechanism including inward folding bars 34a, 34a. The lifting members 31 are provided to lift the laterally folded bag on opposite sides of the central inflater opening. The longitudinal outward folding mechanism 33 is divided into two sections each having a plurality of stages arranged to fold the airbag in a direction perpendicular to the lateral folds. The inward folding mechanism has two sections each having an inward folding bar 34a. The inward longitudinal folding bars may be move towards and away from one another. The inward folding bars are arranged to interleave with upper and lower outward folding bars 33a, 33b of the respective outward folding mechanism section. The inward folding bars may be driven longitudinally inward and outward relative to the central area of central plate 11 to accomplish the desired folding.

More specifically, the lifting member 31 is arranged so that its upper end is set at almost the same level as the working surface of the working table A in the normal position. The low end of the lifting member is coupled with a piston rod 32a of a second vertical cylinder 32. Its use will be described in more detail below.

The longitudinal outward folding mechanism 33 is divided into two sections, as noted above, and each section includes upper and lower stages in the form of folding bars 33a, 33b. The inward folding mechanism 34 also has two sections, each of which includes an inward folding bar 34a. The inward folding bars 34a are carried by a bracket type holding arm 37 coupled with a piston rod 35a provided at the upper stage 30. Each of the inward folding bars 34a is connected to a piston rod 49a as seen in FIG. 2. Guide posts 36 to guide movement of the holding arm 37 are provided adjacent the ends of the inward folding bars.

The holding arm 37 supports holding rods 38, 39, 40 which extend horizontally in parallel. The holding rod 38 is for the upper stage and is coupled with the piston rod 41a of a fourth vertical cylinder 41 carried by the holding arm 37. The bracket holding arm 37 may be driven in the vertical direction through an auxiliary holding arm 42. Both ends 38a of the upper stage holding rod 38 extend into corresponding holes (not illustrated) formed in the side walls of the holding arm 37.

Upper stage holding rod 38 carries a pair of holding blocks 44. Similarly, the lower stage holding rod 40 carries a pair of holding blocks 43. Each holding block supports a folding bar. Thus, the outward folding bars 33a, 33b are held respectively by the upper and lower stage holding rods 38, 40 through holding blocks 43, 44. The holding block pair 43, 43 of the lower stage are preferably positioned close to one another like the blocks 23 on the outward folding bar 21 in the lateral folding mechanism.

The holding rod 39 is positioned between holding rods 38 and 40 and is arranged to slidably hold a pair of longitudinal inward folding bars 34a, 34a through slide holding blocks 45, 45. The slide holding blocks 45 are coupled with the piston rods 47a of an opposing pair of third horizontal cylinders 47 provided in opposing sides of the bracket type holding arm 37. Each longitudinal inward folding bar 34a is slidably held by an associated slide holding block 45 through the slide groove 45a. Thus, the pistons 47 may be used to control the spacing between the inward folding bars, which in turn controls the width of the inward folds.

One end of each inward folding bar 34a is coupled with a piston rod 49a of a fourth horizontal cylinder 49 provided in the rear wall of the slide holding block 45.

The construction of the bag holding means D will be described next. The bag holding means D includes a pair of inward suppressing members 51 and a pair of outward suppressing members 53. The suppressing members are arranged above the central plate 11. When the lateral folds have been completed, the supressing members are lowered (arrow D1) to hold the airbag Z until the longitudinal folding process begins.

More particulary, each suppressing member 51, 53 includes a suppressing block 52 which is coupled to a piston rod 55a of a vertical cylinder 55. The vertical cylinders are coupled to the lower stage of rack 50. A guide post 56 is also provided.

In order to ensure that the airbag is reliably held, cutout portion C1, C2 are formed in the front end of the inward lateral folding mechanisms 26. Thus, when the inward folding bars 26a–c move together under the influence of the second horizontal cylinders 29 and stop face to face, the suppressing blocks 52, 52 can directly engage the laterally folded airbag Z. The cutout portion may be formed only in the uppermost inward folding bar 26a.

The various inward and outward folding bars used do not need to be formed as the flat plates as shown in the various figures. Rather, they may take the form of frame or rod type bars. Naturally, the driving means for the various bars is not limited to the piston and cylinder type arrangements described. Similarly, link mechanisms could be readily devised to coupled multiple bars to a single drive mechanism.

A method for folding the airbag using the first described folding apparatus will be explained referring primarily to FIG. 4. Although not described in detail, it should be appreciated that a control structure may be readily devised to operate the various bars and mechanism in sequential order.

The inflater fitting hole of the airbag Z is set on the central plate 11 of the working table A. Specifically, the airbag support plate 10 is set on the setting hole 9 in the center of central plate 11. (FIG. 4A). A vacuum pump (not shown) coupled to the setting hole then sucks any air from the airbag Z. It is noted that in some cases, it may not be necessary to evacuate the airbag.

The opposing sections of the outward lateral folding mechanism 21 are then moved towards the central plate 11. When the outward lateral folding bars are properly positioned, the mechanism 21 is lowered so that the folding bar 21c of the lower stage presses the airbag Z against the central plate 11. FIG. 4B.

The inward folding mechanism 26 is then lifted together with the front and back plates 12, 13. Thus, the opposite sides of the airbag are lifted by the front and back plates respectively, while the central portion of the airbag remains held in place by the lower stage of the outward folding mechanism 26. The lifting step positions the folding bars 26a–c of the inward folding mechanism such that they are interleaved with respect to the corresponding folding bars 21a–c of the outward folding mechanism 21. The lower inward folding bar pair 26c are then actuated so that each bar is inserted into the gap between stages 21c and 21b of the adjacent outward folding mechanism as shown in FIG. 4C. As can be readily seen in that figure, this imparts the initial lateral fold to the airbag. The remaining stages of the inward folding mechanism 21 are then actuated in the same manner. Thus, the second and third fold layers are formed in the same manner as the first. In the described embodiment, the upper and intermediate stages are actuated simultaneously (FIG. 4D). The primary reason that the lower stage is actuated separately is to reduce friction during the folding process. Typically this is not as important during the second and third folds because the airbag is substantially circular and the contacted area is significantly less. However, it should be appreciated that all of the folding bar pairs may be actuated sequentially or simultaneously depending upon the needs of the system.

Once the lateral folds have been completed, the outward folding mechanism 21 is removed. To facilitate removal, the outward folding bars from opposing sections are preferably brought together a small amount prior to removal. This reduces the tension on the airbag during the removal stage. After the outward folding mechanism 21 has been removed, the suppressing members 51, 53 are lowered (arrow D1) such that the suppressing blocks 52 press against the upper inward folding bars 26a as seen in FIG. 4E. Thereafter, the inward folding bars are removed. Preferably, these bars will be removed in sequential pairs with the upper bars 26a being removed first. This insures that the lateral folds will not be impaired during removal.

In an alternative arrangement, the inward folding bars could be removed before the outward folding bars.

After the lateral folding bars have been removed, the longitudinal outward folding mechanism 33 is moved (arrow C1 in FIGS. 1 and 3) into the position shown in FIG. 4G where its lower folding bars 33b hold the airbag Z on the central plate of 11. The inward suppressing member 51 is then lifted upward to remove the inner suppressing blocks 52. It is noted that outer suppressing members 53 with their blocks 52 remain in place.

The lifting members 31 are then actuated to lift opposing sides of the airbag just outside the folding bars 33b as seen in FIG. 4H. Since the outer suppressing members 53 remain in place, the outer edges of the airbag are held against the central plate 11. Again, this prevents the airbag from unfolding during the longitudinal folding steps.

The longitudinal inward folding bars 34 are then moved into position by sliding them under the raised portions of the airbag. After they are positioned, they are actuated to slide into the spaces between their respective associated outward folding bars 33a and 33b (FIG. 4I), FIG. 4H. The upper outward folding bars 33a is then lowered to complete the folding and hold the folded airbag in place. The entire airbag is then lifted upward to a working position by movement of a cylinder 35. A worker then manually folds the bag over the upper surfaces of upper inward folding bars 33a to complete the longitudinal folding. The folded airbag Z is then manually removed by withdrawing it in parallel to the longitudinal folding bars. From the standpoint of working efficiency, it is desirable that the total width of the longitudinal outward folding bar 33 be relatively small. That is, not much wider than the central plate 11.

In the described method, it is desirable that the total thickness of the airbag be 6 mm or less since thinner airbags can be folded more easily than thicker bags.

Embodiment 2

Figure 11:
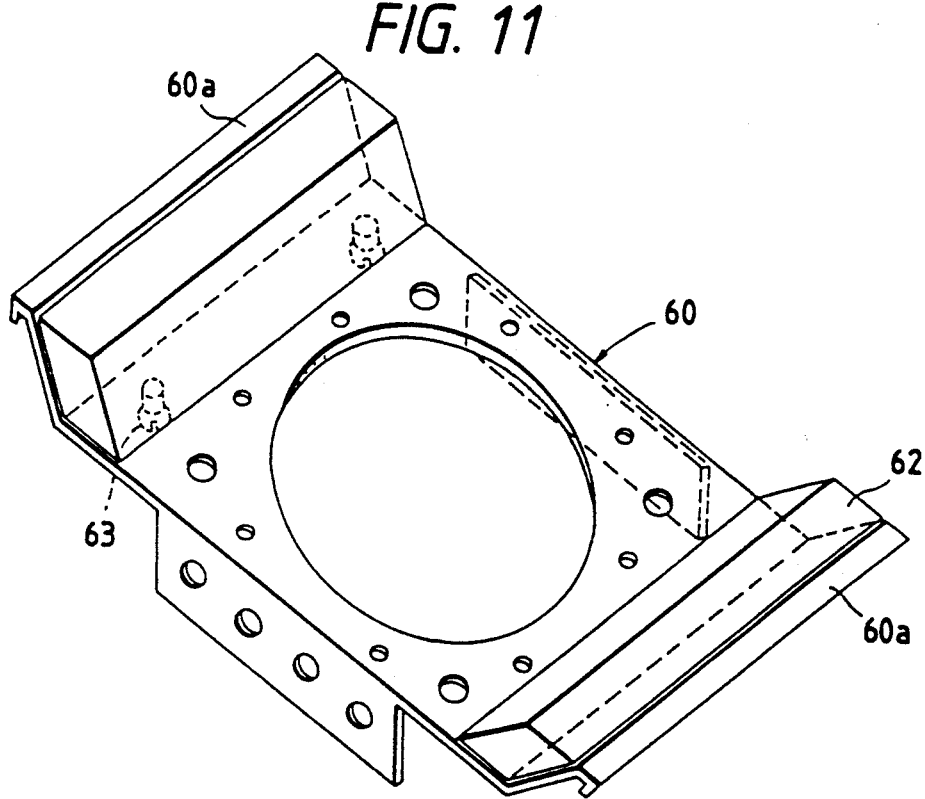
FIG. 11 is a perspective view of an airbag holder used in the second embodiment.

A second embodiment of the invention will be described with reference to FIGS. 8–11. This embodiment is intended fold an airbag having a holder 60 secured about the inflater fitting hole. The holder 60 has longitudinal flanges 60a on opposite sides thereof as best seen in FIG. 11. For the convenience of this description, the right and left sides of the device as seen in FIG. 8 are considered to be right and left sides of the apparatus for the purpose of the explanation that follows.

Elements in the second embodiment that correspond to elements in the first described embodiment are given like numerals and the detailed explanation of those parts is generally not repeated herein.

Figure 6:
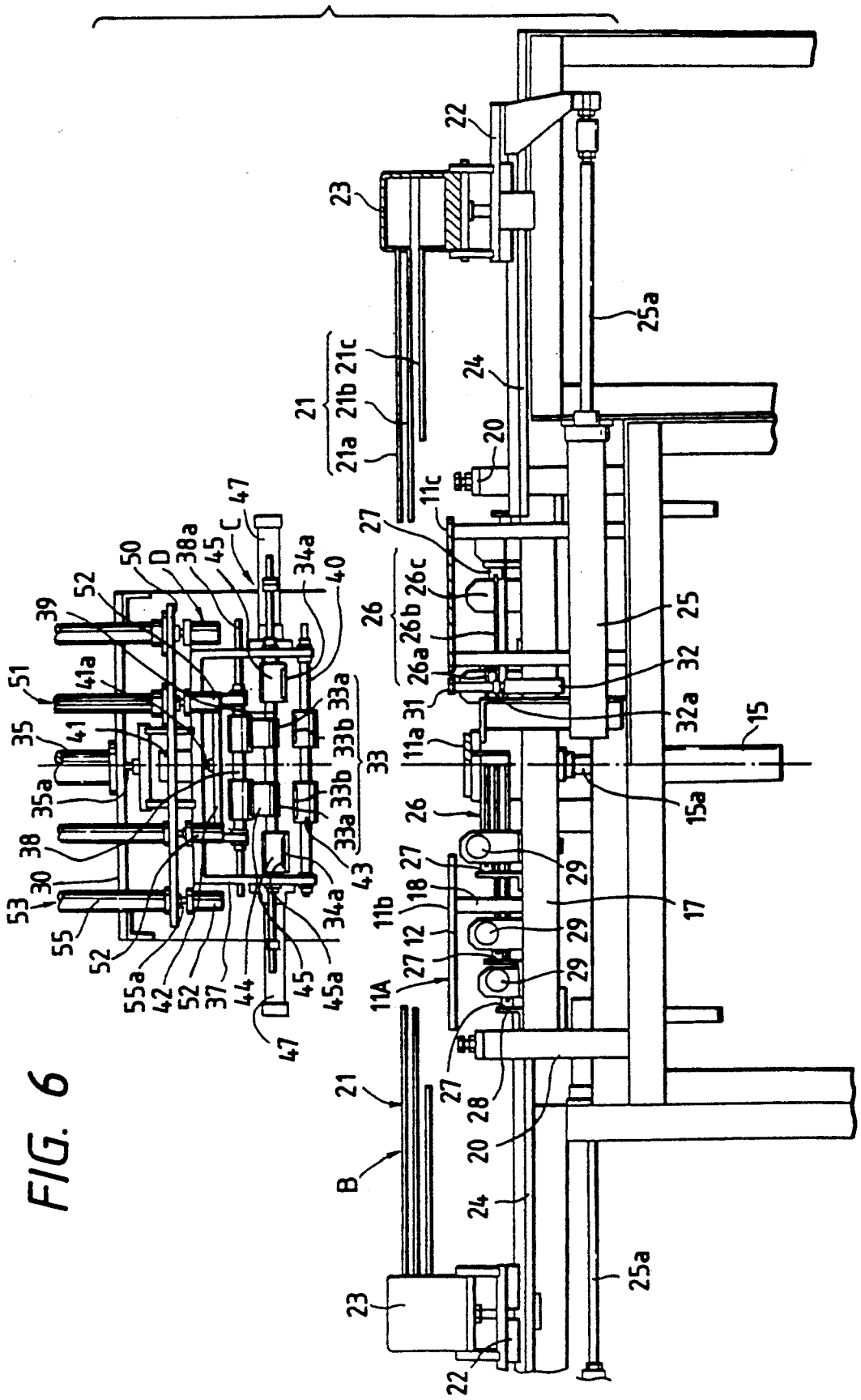
FIG. 6 is a schematic half-sectional front elevation showing an apparatus for folding an airbag in accordance with a second embodiment of the present invention.
Figure 7:
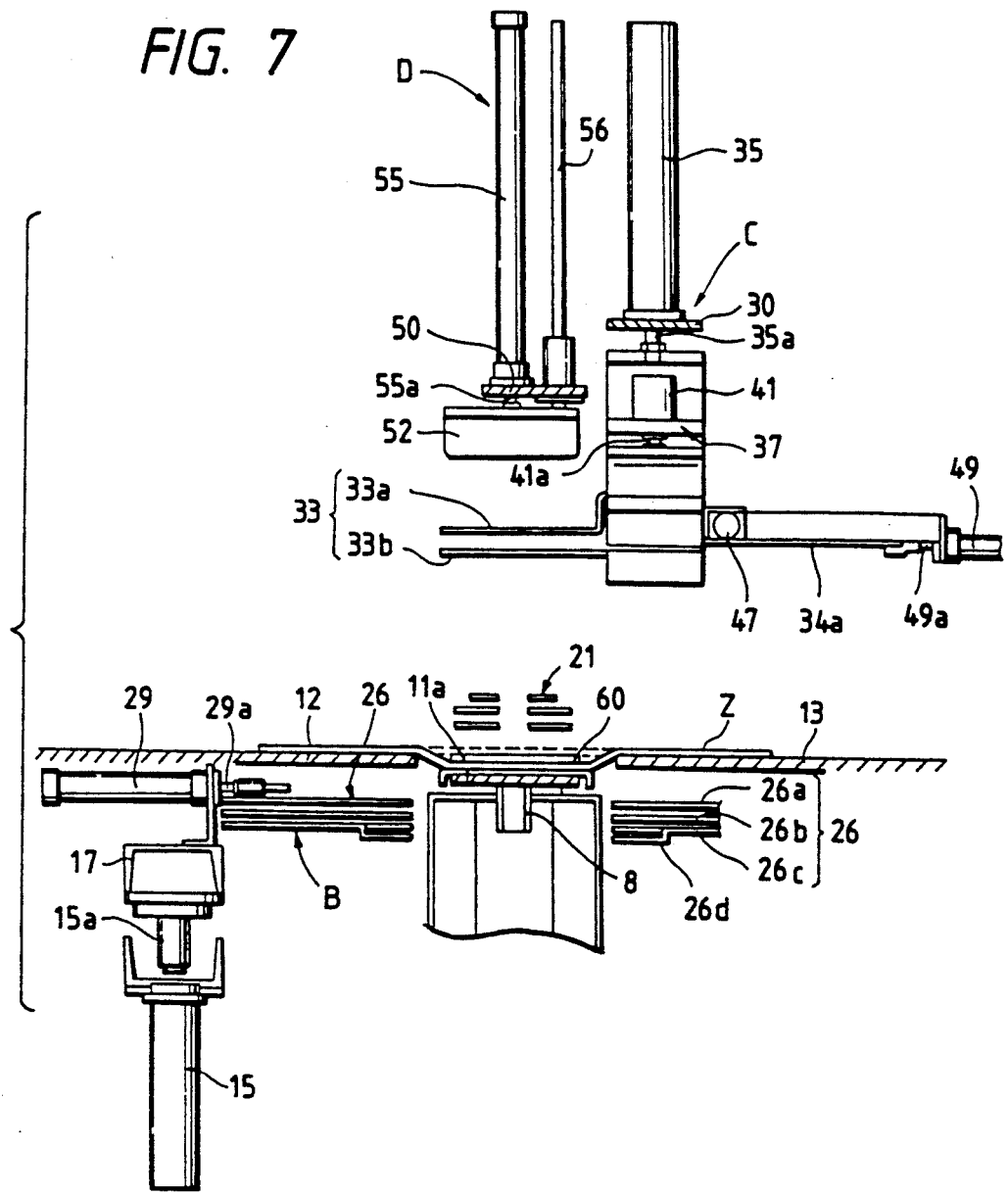
FIG. 7 is a schematic side elevation of the folding apparatus shown in FIG. 6.

The apparatus of the second embodiment includes a working table A, a lateral folding means B, a longitudinal folding apparatus C and a bag holding means D. FIG. 6 is a half cutout schematic front elevation of an apparatus for folding the airbag and FIG. 7 is a schematic side elevation. The plan view of the apparatus is similar that of the first embodiment shown in FIG. 2.

Figure 8A:
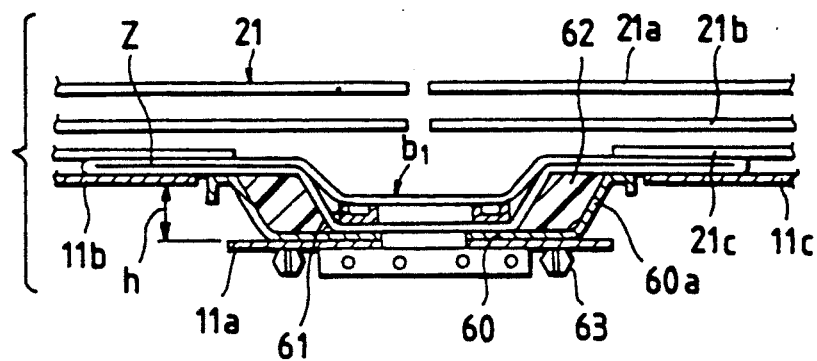
FIGS. 8A and 8B are lateral sectional and longitudinal sectional views showing how the airbag is held by the lateral outward folding mechanism after the airbag is set.

The working table A in this embodiment is wider than that of the preceding embodiment. Thus it is wider than the intended folding width of the airbag Z. The central, front and back plates 11A, 12 and 13 respectfully are symmetrically arranged to form a working surface sized such that the airbag Z can be extended thereon. The primary distinction between this arrangement and the first embodiment is that the central plate 11A takes the form of a setting table 11a and a pair of folding tables 11b, 11c. As best seen in FIGS. 6 and 8a, the folding tables 11b, and 11c may be raised slightly above the setting table 11a. In fact, the difference in height is an amount h which is approximately the same as the height of the flanges 60a.

The front and back plates 12, 13 can moved between the setting table 11a position and the raised position of the folding plates. Thus, the outer portions of the airbag Z may be raised so that they are located above the central area thereof. That is, the outer portions of the bag may be moved above the upper surface of the standing flange 60a of the holder 60.

The central area of setting table 11a has a plurality of fitting holes (not illustrated). Fitting bolts (not illustrated) protrude downwardly from a retainer 61 in the airbag through the holder 60 and into the fitting holes to engage the fitting holes. Thus, the airbag may be firmly secured to the table. In other respects, the structure of the working table is the same as the structure in the first embodiment.

The lateral folding means B includes lateral outward and inward folding mechanisms 21, 26 respectively. Each folding mechanism is arranged as two opposing sections each having a plurality of stages in the form of folding bars. The structure of the inward and outward folding mechanisms is much the same as in the previously described embodiment. Thus, the various inward and outward folding bars are moveable back and forth relative to one another so that they may be interleaved in the manner previously described.

The only difference from the first embodiment is that the length of the lowest outward lateral folding bar 21c is shorter than the upper and intermediate folding bar stages 21a, 21b FIG. 6). Thus, when the folding bars of the outward folding mechanism are extended to their closed positioned during folding, the lower folding bar 21c is not positioned above the recessed part b1 of the airbag holder 60 or its standing flanges 60a.

Moreover, the folding bars 26c of the lowest stage of the inward folding mechanism each includes a suppressing plate 26d having an L-shaped section which protrudes downwardly opposite the recessed part b1 of the holder 60. In other respects the structure of the lateral folding means is similar to that of the first embodiment.

The longitudinal folding means C includes a pair of lifting members 31 arranged to lift the airbag Z in the region between setting table 11a and folding tables 11b, 11c, respectively. The longitudinal outward folding mechanism 33 has a plurality of stages arranged to be driven in a direction perpendicular to the that of the lateral folding mechanism. Each section of the inward folding mechanism 34 has one or more bars arranged to interleave with the outer folding bars. In other respects, the structure of the longitudinal folding means is similar to that of the first embodiment.

The bag holding means D is composed of a pair of inward suppressing members 51 and a pair of outward suppressing members 53 arranged above the central plate 11A. Like the previous embodiment, the suppressing members hold the airbag Z after it has been folded in the lateral direction. The only difference from the first embodiment is that a cutout part C1 is provided on the uppermost inward folding bars 26a. In other respects the structure of the bag holding means is similar to that of the first embodiment.

A method for folding an airbag using the folding apparatus of the second embodiment will now be explained reference principally to FIGS. 8-10. The driving means explained below employs a structure that drives the cylinders based on sequential control.

The airbag Z is placed on the working table A with the holder 60 placed on the setting table 11a. The fitting bolts which protrude downward from the retainer 61 are set in fitting holes provided in the setting table. Thereafter, the airbag is extended on the working table A. Clips 63 as shown in FIG. 8A may be used to secure the bolts. Since the setting table 11a is lower than the folding tables 11b, 11c, by an amount almost equal to the height of the standing flanges 60a of the holder 60, the upper surface of the flanges 60a are at substantially the same level as the surfaces of the folding tables 11b, 11c. A vacuum pump may then be actuated to evacuate any air from the bag. As before, the vacuum step is optional.

Figure 8B:
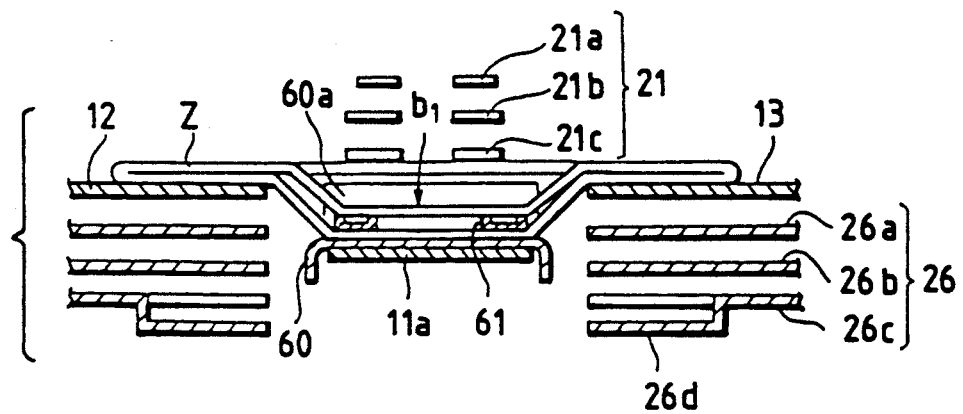

To initiate folding, the outward lateral folding mechanism 21 is moved into position over the central plate 11A. It is then lowered such that the lowermost folding bar 21c presses against the airbag to hold it in place as shown in FIGS. 8A & 8B.

Figure 9A:
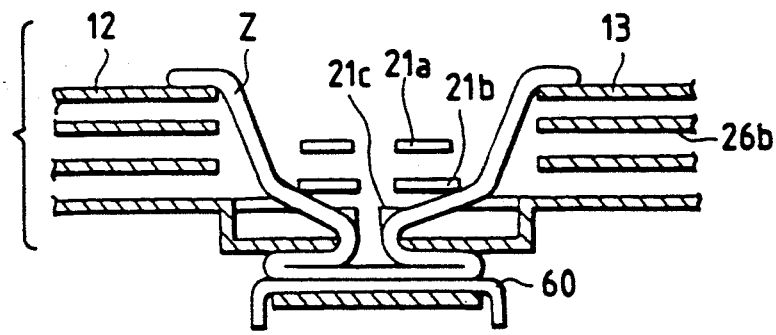
FIGS. 9A-9C show steps in the lateral folding process in accordance with the second described method of folding airbags.
Figure 9B:
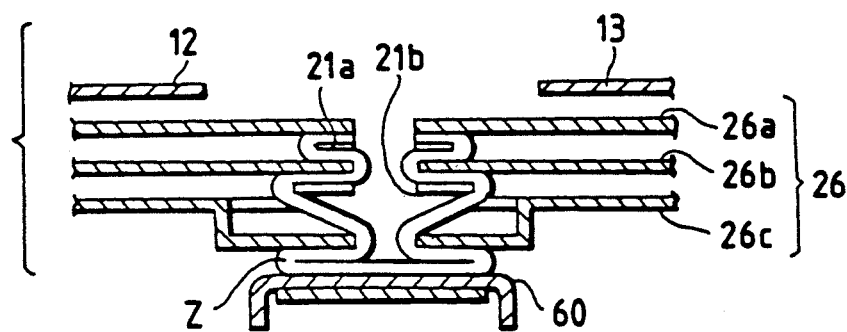
Figure 9C:
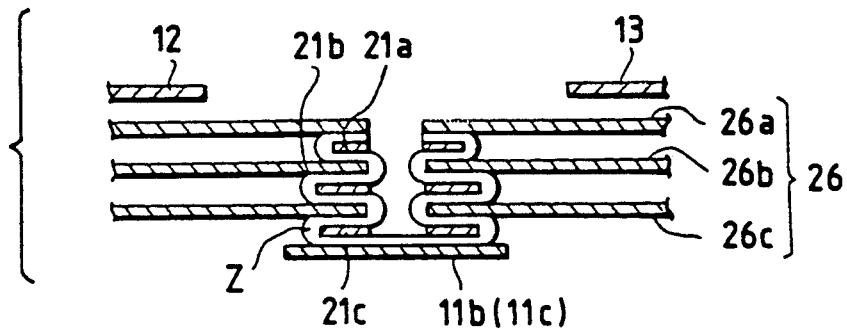

The inward lateral folding mechanism 26 is then raised together with the front and back plates 12, 13 thus raising the outer portions of the bag. The folding bar pairs of the inward folding mechanism 26 are then sequentially actuated beginning with the lower bars 26c to accomplish the desired folds (see FIGS. 9A, 9B, 9C). Since the lowest of stage inward folding bars are provided with suppressing plates 26d, the first stage of outward folds in the region of setting table 11a are carried out by the suppressing plate as shown in FIGS. 9A, 9B. At the same time, in the regions of folding tables 11b, 11c, bar 26c accomplishes the fold, as shown in FIG. 9C. If necessary, the outward folding bars may be moved forward simultaneously.

Thereafter, the intermediate and upper stages may be actuated to complete the lateral folding as shown in FIG. 9C. As before, it is contemplated that a plurality of the outward fold bar stages could be moved simultaneously.

The suppressing members 51 and 53 are then actuated to hold the airbag Z. The inward folding bars are then gradually removed (see FIG. 10A). It is desirable that the inward folding bar pairs be sequentially removed, with the upper bars 26a being removed first. As before, when the outward folding bars are removed, it is desirable that they be drawn together a little before they are removed. Again, the outward folding mechanism 21 could be removed after the inward folding mechanism 26.

The longitudinal folding procedure is then executed in the same manner as described in the first embodiment. Once the folds have been accomplished, and the airbag Z has been moved upward to the working position to facilitate removing the bag, the main worker manually folds the outer edges of the airbag over the upper longitudinal outward folding bar 33a, thereby completing the longitudinal folding process. The folded airbag is then removed by manually drawing it in parallel to the folding bars. To facilitate removal of the bag and improve to working efficiency, the outward folding bars are drawn slightly together before removing the bag.

As before, since the airbag Z is slid between various bars as it is folded, thinner airbags can be folded more easily than thicker bags. Accordingly, it is desirable that the thickness of the airbag be no more than 6 mm.

With the method and apparatus described above, the airbag folding may be accomplished by a single worker, unlike the prior methods described above. Moreover, the folding bars are set sequentially and automatically. Therefore, setting errors are eliminated. In addition, the sliding action of the airbag passing over the respective folding bars during folding tends to press the airbag, reducing the number of wrinkles created during folding. The bag is also consistently and accurately folded to the desired size. Accordingly, the man-hours of labor required to accomplish the folding may be reduced substantially and folding size errors eliminated.

Although only a couple of embodiments of the present invention have been described herein, it should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope of the appended claims.

We claim:

1. An apparatus for folding an airbag a plurality of times in stages of predetermined width comprising:
   a working surface having a setting portion for holding an airbag;
   an outward lateral folding mechanism and an outward longitudinal folding mechanism, each including at least two spaced apart outward folding bars which are selectively movable between a position laterally spaced from said setting portion and a position over said setting portion;
   an inward lateral folding mechanism and an inward longitudinal folding mechanism, each including at least one inward folding bar which is selectively moveable between a position laterally spaced from the outward folding bars and a position interleaved with the respective outward folding bars, to fold said airbag,
   said outward lateral folding mechanism comprising first and second sets of at least two vertically spaced apart outward lateral folding bars, said outward longitudinal folding mechanism comprising first and second sets of at least two vertically spaced apart outward longitudinal folding bars, said inward lateral folding mechanism comprising first and second sets of at least one inward lateral folding bar, and said inward longitudinal folding mechanism comprising first and second sets of at least one inward longitudinal folding bar, and wherein said airbag includes a central inflater opening;
   said inward and outward folding bars are all arranged in parallel, with the first set being located on a first side of said central opening and the second set being located on a second side of said central opening.

2. An apparatus for folding an airbag a plurality of times in stages of predetermined width comprising:
   lateral folding means comprising a plurality of parallel, vertically spaced apart outward lateral folding bars and at least one inward lateral folding bar mounted to selectively interleave with the outward lateral folding bars to laterally fold the airbag; and
   longitudinal folding means comprising a plurality of parallel, vertically spaced apart longitudinal outward folding bars arranged in a direction substantially orthogonal to the lateral outward folding bars, and at least one inward longitudinal folding bar mounted to selectively interleave with the outward longitudinal folding bars to longitudinally fold the airbag,
   holding means for holding the airbag after it has been laterally folded and before it has been longitudinally folded,
   lifting means for lifting at least one longitudinal end portion of the laterally folded air bag; and
   means for positioning each inward longitudinal folding bar underneath the raised portions of the airbag.

3. An apparatus as recited in claim 2, wherein said plurality of outward and inward lateral folding bars are divided into two opposing sets, each set including at least two outward folding bars and at least one inward folding bar with one lateral folding bar set being located on a first side of said airbag and the second lateral folding bar set being located on a second side of said airbag.

4. An apparatus as recited in claim 3, wherein said lateral folding means further includes means for selectively, independently actuating opposing pairs of said inward lateral folding bars to move towards and away from one another.

5. An apparatus as recited in claim 2, further comprising:
   a central plate for supporting a central area of the airbag;
   a pair of supporting plates disposed on opposite sides of the central plate for supporting outer portions of the airbag, the supporting plates being vertically movable relative to the central plate so as to raise opposite sides of the airbag relative to the central area of the airbag; and
   wherein each inward lateral folding bar is positioned underneath said supporting plates.

6. An apparatus for folding an airbag a plurality of times in stages of predetermined width comprising:
   a working surface having a setting portion for holding an airbag;
   an outward folding mechanism including at least two spaced apart outward folding bars, the outward folding bars being movable between a position laterally spaced from said setting portion and a position over said setting portion;
   an inward folding mechanism including at least one inward folding bar, each inward folding bar being selectively moveable between a position laterally spaced from the outward folding bars and a position interleaved with the outward folding bars, to fold said airbag,
   a central plate for supporting a central area of the airbag;
   a pair of supporting plates disposed on opposite sides of the central plate for supporting outer portions of the airbag, the supporting plates being vertically movable relative to the central plate in order to raise opposite sides of the airbag relative to the central area of the airbag, the central and supporting plates together defining said working surface;
   the airbag including a holder having a pair of standing flanges, and wherein the central plate includes:

a setting plate defining said setting portion of the working surface, the setting plate receiving the holder so as to support the central area of the airbag; and a pair of folding plates disposed on opposite ends of the setting plate, the folding plates being raised relative to the setting portion by an amount substantially equal to a height of the standing flanges.

7. An apparatus as recited in claim 6, wherein said outward lateral folding mechanism comprises first and second sets of at least two vertically spaced apart outward lateral folding bars, said outward longitudinal folding mechanism comprises first and second sets of at least two vertically spaced apart outward longitudinal folding bars, said inward lateral folding mechanism comprises first and second sets of at least one inward lateral folding bar, and said inward longitudinal folding mechanism comprises first and second sets of at least one inward longitudinal folding bar.

8. An apparatus as recited in claim 7, wherein the second set of outward folding bars are arranged substantially perpendicularly with respect to the first set of outward folding bars such that the first sets of outward and inward folding bars are arranged to laterally fold the airbag and the second sets of outward and inward folding bars are arranged to longitudinally fold the airbag.

9. An apparatus for folding an airbag a plurality of times in stages of predetermined width comprising:

a central plate for supporting a central area of the airbag; and a pair of supporting plates disposed on opposite sides of the centrl plate for supporting outer portions of the airbag, the supporting plates being vertically movable relative to the central plate in order to raise opposite sides of the airbag relative to the central area of the airbag;

lateral folding means including:

an outward lateral folding mechanism including a plurality of spaced apart outward folding bars mounted in two opposing sets, the outward folding bar sets being movable between respective positions spaced from said central plate and respective positions over said central portion, and an inward folding mechanism including a plurality of spaced apart inward folding bars mounted in two opposing sets, the inward folding bars being selectively moveable between respective positions spaced from the outward folding bars and respective positions wherein each inward folding bar in each inward folding bar set is interleaved with outward folding bars of a respective outward folding bar set to laterally fold opposing sides od said airbag, the inward folding bar sets being positioned vertically below said supporting plates;

longitudinal folding means including:

an outward longitudinal folding mechanism including a plurality of spaced apart outward longitudinal folding bars mounted in two opposing sets, and an inward longitudinal folding mechanism including a pair of opposing inward longitudinal folding bars that are selectively moveable between respective positions spaced from the outward longitudinal folding bars and respective positions wherein each inward longitudinal folding bar is interleaved with the outward longitudinal folding bars of a respective outward longitudinal folding bar set to longitudinally folding opposite longitudinal ends of said airbag; and means for adjusting a lateral gap between the outward lateral folding bar sets.

10. An apparatus for folding an airbag as recited in claim 9, wherein the airbag includes a holder having a pair of standing flanges, and wherein the central plate includes:

a setting plate defining said setting portion of the working surface, the setting plate holding the central area of the airbag; and a pair of folding plates disposed on opposite ends of the setting plate, the folding plates being vertically raised relative to the setting portion by an amount substantially equal to the height of the standing flanges.

11. An apparatus as recited in claim 9, further comprising means for adjusting a gap between the outward longitudinal folding bar sets.

12. An apparatus as recited in claim 9, wherein said lateral folding means further includes means for selectively, independently actuating opposing pairs of said inward lateral folding bars.

13. An apparatus for folding an airbag a plurality of times in stages of predetermined width comprising:

a central plate for supporting a central area of the airbag;

a pair of supporting plates disposed on opposite sides of the central plate for supporting outer portions of the airbag, the supporting plates being vertically movable relative to the central plate in order to raise opposite sides of the airbag relative to the central area of the airbag;

lateral folding means including:

an outward lateral folding mechanism including a plurality of spaced apart outward folding bars mounted in two opposing sets, the outward folding bar sets being movable between respective positions spaced from said central plate and respective positions over said central portion, and an inward folding mechanism including a plurality of spaced apart inward folding bars mounted in two opposing sets, the inward folding bars being selectively moveable between respective positions spaced from the outward folding bars and respective positions wherein each inward folding bar in each inward folding bar set is interleaved with outward folding bars of a respective outward folding bar set to laterally fold opposing sides of said airbag, the inward folding bar sets being positioned vertically below said supporting plates;

longitudinal folding means including:

an outward longitudinal folding mechanism including a plurality of spaced apart outward longitudinal folding bars mounted in two opposing sets, and an inward longitudinal folding mechanism including a pair of opposing inward longitudinal folding bars that are selectively moveable between respective positions spaced from the outward longitudinal folding bars and respective positions wherein each inward longitudinal folding bar is interleaved with the outward longitudinal folding bars of a respective outward longitudinal folding bar set to longitudinally folding opposite longitudinal ends of said airbag; and the airbag including a holder having a pair of standing flanges and the central plate includes:

a setting plate defining said setting portion of the working surface, the setting plate holding the central area of the airbag;

a pair of folding plates disposed on opposite ends of the setting plate, the folding plates being vertically raised relative to the setting portion by an amount that is substantially equal to the height of the standing flanges.

14. An apparatus as recited in claim 13, further comprising means for adjusting a gap between the outward longitudinal folding bar sets.

15. An apparatus as recited in claim 13, wherein said lateral folding means further include means for selectively, independently actuating opposing pairs of said inward lateral folding bars.

* * * * *